(12) United States Patent
Xiong

(10) Patent No.: US 8,970,696 B2
(45) Date of Patent: Mar. 3, 2015

(54) HAND AND INDICATING-POINT POSITIONING METHOD AND HAND GESTURE DETERMINING METHOD USED IN HUMAN-COMPUTER INTERACTION SYSTEM

(75) Inventor: Huaixin Xiong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 724 days.

(21) Appl. No.: 13/215,385

(22) Filed: Aug. 23, 2011

(65) Prior Publication Data

US 2012/0062736 A1  Mar. 15, 2012

(30) Foreign Application Priority Data

Sep. 13, 2010 (CN) .......................... 2010 1 0279511

(51) Int. Cl.
*H04N 7/18* (2006.01)
*G06F 3/01* (2006.01)
*G06F 3/042* (2006.01)
*G06K 9/00* (2006.01)

(52) U.S. Cl.
CPC .............. *G06F 3/017* (2013.01); *G06F 3/0425* (2013.01); *G06K 9/00355* (2013.01)
USPC ........... 348/143; 345/156; 348/133; 382/103; 382/104; 382/156; 382/118; 382/291

(58) Field of Classification Search
USPC .......... 345/156; 348/143, 333; 382/103, 104, 382/156, 118, 291
See application file for complete search history.

(56) References Cited

U.S. PATENT DOCUMENTS

| 5,168,531 | A  | * | 12/1992 | Sigel ............................ 382/291 |
| 6,594,616 | B2 |   | 7/2003  | Zhang et al. |
| 6,654,001 | B1 | * | 11/2003 | Su ................................ 345/156 |
| 6,788,809 | B1 | * | 9/2004  | Grzeszczuk et al. .......... 382/103 |
| 2003/0059092 | A1 | * | 3/2003 | Okubo et al. ................. 382/118 |
| 2003/0178493 | A1 |   | 9/2003 | Njolstad |

(Continued)

FOREIGN PATENT DOCUMENTS

GB  2365831 A * 2/2002

OTHER PUBLICATIONS

Wu, A. et al., "A Virtual 3D Blackboard: 3D Finger Tracking using a Single Camera", Mar. 2000, Automatic Face and Gesture Recognition, 200. Proceedings. Fourth IEEE International Conference on, pp. 1-8.*

(Continued)

*Primary Examiner* — Dave Czekaj
*Assistant Examiner* — Shanika Brumfield
(74) *Attorney, Agent, or Firm* — Oblon, McClelland, Maier & Neustadt, L.L.P.

(57) ABSTRACT

Disclosed are a hand positioning method and a human-computer interaction system. The method comprises a step of continuously capturing a current image so as to obtain a sequence of video images; a step of extracting a foreground image from each of the captured video images, and then carrying out binary processing so as to obtain a binary foreground image; a step of obtaining a vertex set of a minimum convex hull of the binary foreground image, and then creating areas of concern serving as candidate hand areas; and a step of extracting hand imaging features from the respective created areas of concern, and then determining a hand area from the candidate hand areas by carrying out pattern recognition based on the extracted hand imaging features.

9 Claims, 12 Drawing Sheets

(56) References Cited

U.S. PATENT DOCUMENTS

| | | | |
|---|---|---|---|
| 2005/0031166 A1* | 2/2005 | Fujimura et al. | 382/103 |
| 2005/0063564 A1* | 3/2005 | Yamamoto et al. | 382/104 |
| 2010/0110266 A1* | 5/2010 | Lee et al. | 348/333.02 |

OTHER PUBLICATIONS

Shahzad Malik, "Real-Time Hand Tracking and Finger Tracking for Interaction", CSC2503F Project Report, Dec. 18, 2003, 21 pages.

Son Do-Lenh, et al., "Multi-Finger Interactions with Papers on Augmented Tabletops", 3rd International Conference on Tangible and Embedded Interaction, Feb. 16-18, 2009, 8 pages.

Andrew Wu, et al., "A Virtual 3D Blackboard: 3D Finger Tracking Using a Single Camera", University of Central Florida, 8 Pages.

Christian Von Hardenberg, et al., "Bare-Hand Human-Computer Interaction", Proceedings of the ACM Workshop on Perceptive User Interfaces 2001, Nov. 15-16, 2001, 8 Pages.

* cited by examiner

FIG.11
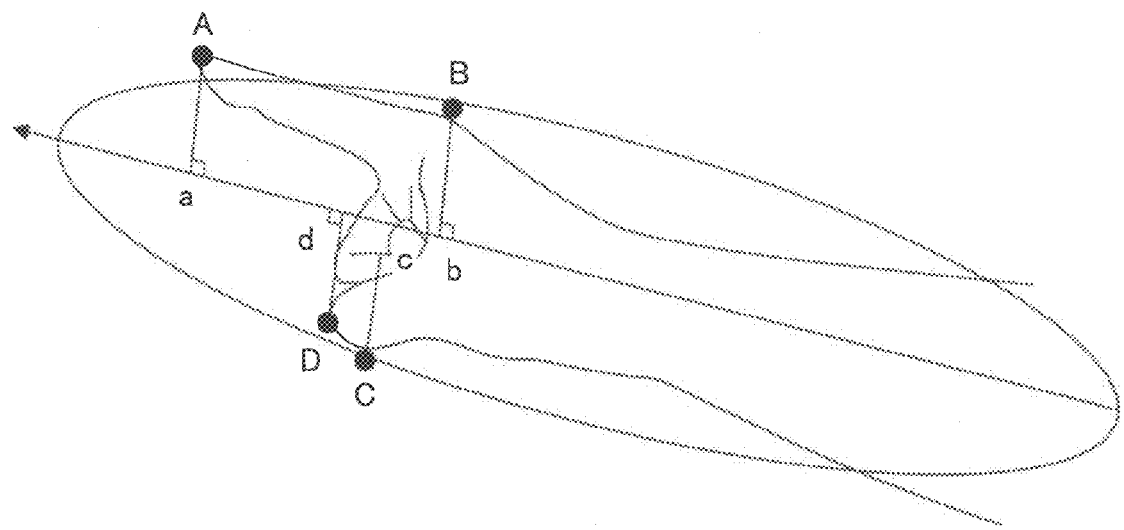
FIG.12
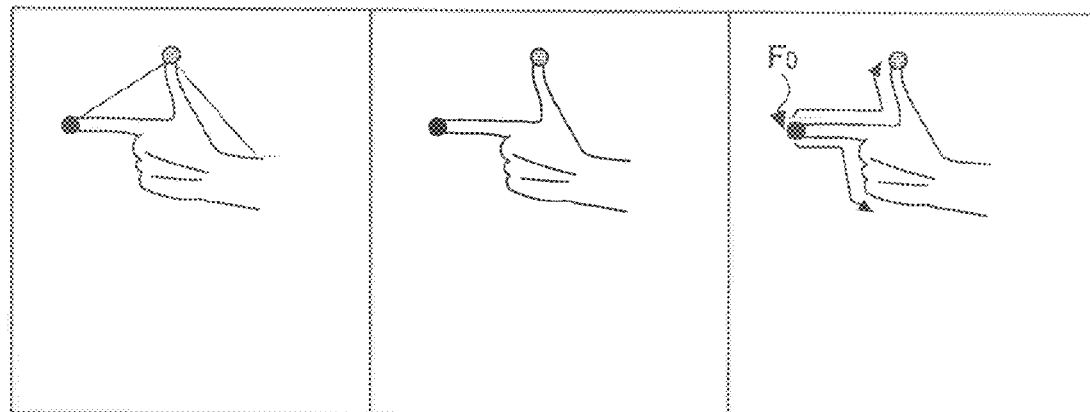
(A)          (B)          (C)
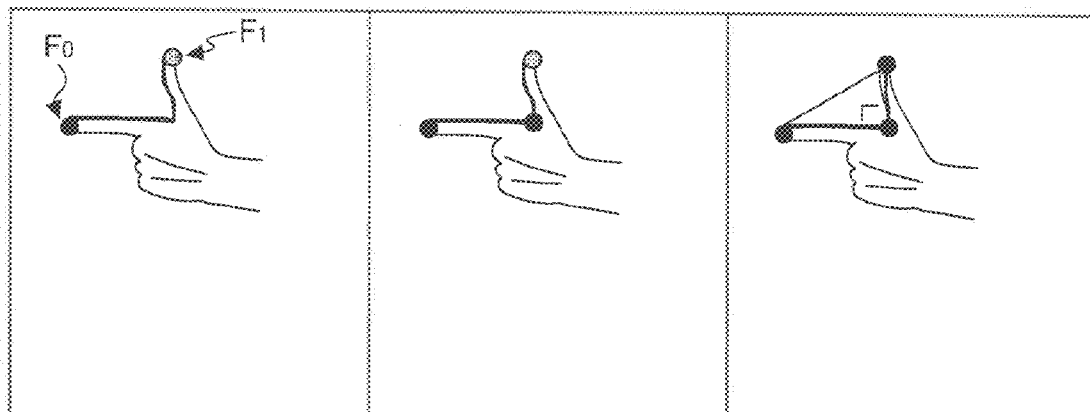
(D)          (E)          (F)

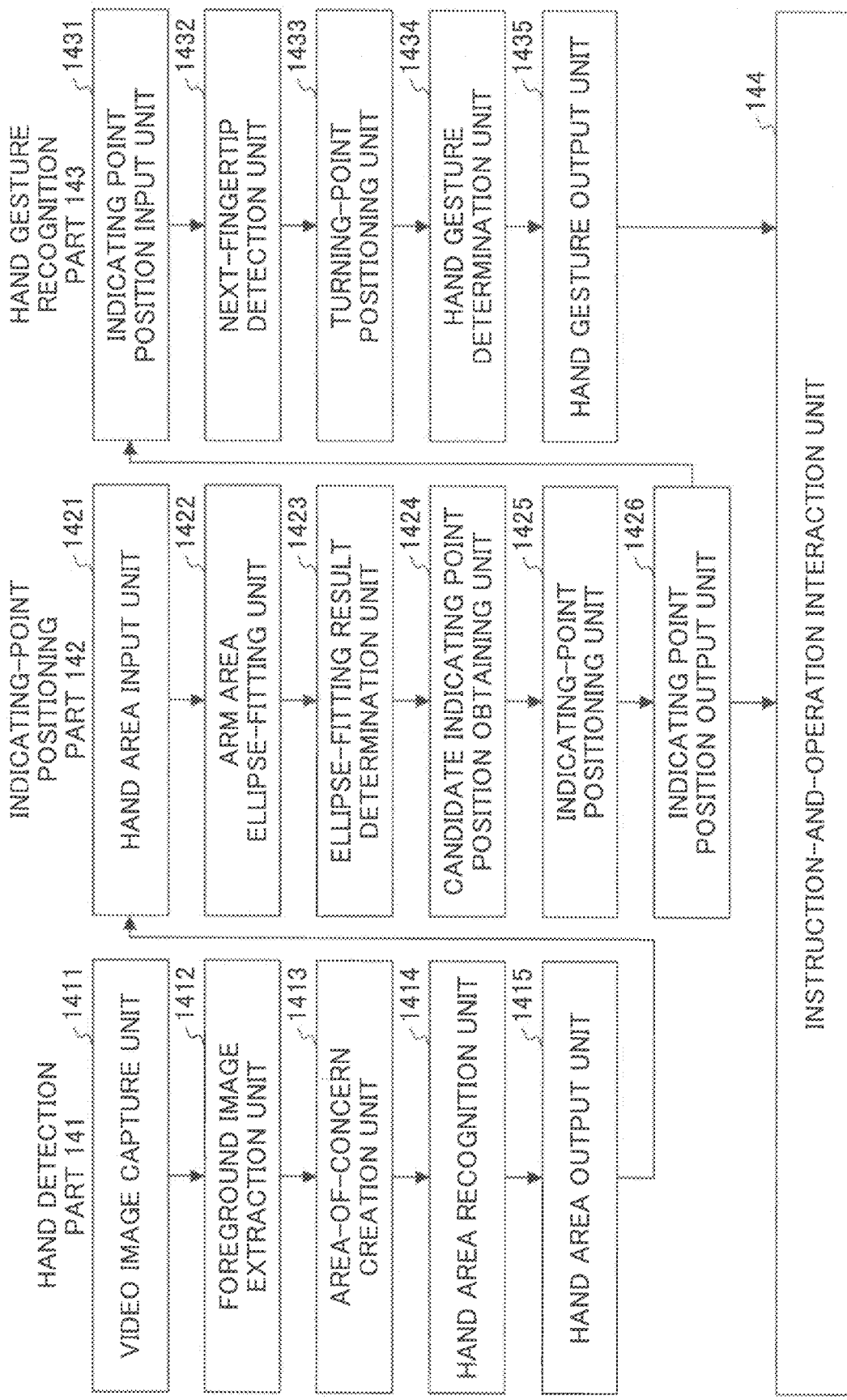

HAND AND INDICATING-POINT POSITIONING METHOD AND HAND GESTURE DETERMINING METHOD USED IN HUMAN-COMPUTER INTERACTION SYSTEM

BACKGROUND OF THE INVENTION

1. Field of the Invention

The present invention relates to a method of positioning a hand of a user and an indicating point like a fingertip as well as a method of determining the hand gesture of the user, used in a human-computer interaction system.

2. Description of the Related Art

Video has been applied to various fields of the society with the rapid development of computer techniques and image processing techniques. Analysis and processing of the video has been become a hot research topic in the current image processing field. A key processing technique is carrying out detection with regard to moving objects or targets in the video, and the detected results are usually used for higher level analysis and processing such as target tracking, classification and others. In various meetings, it is helpful for carrying out a presentation to adopt a projector as an assistant tool. However, during the presentation, a presenter sometimes needs to point out contents projected on a projection area so that audience may combine what they heard with the displayed contents, or needs to carry out interactive operations such as turning a slide, drawing a line, annotating a text segment, etc. In general, these kinds of interactive operations are achieved based on handling a mouse of a computer by a presenter; in other words, the presenter needs to walk back and forth between the computer and a projection screen. It is apparent that this kind of handling method is very inconvenient for the presenter. As a result, it is desirable to provide a human-computer interaction (HCI) system by which it is possible to directly carry out interaction with contents projected on a projection area by using a hand of a user himself or an object like a rod in the hand, or simply speaking, by which it is possible to use a finger of a user to replace some functions of a mouse.

In the below cited reference No. 1, a vision-based gesture interface system, which employs an arbitrary quadrangle-shaped panel and a pointer tip like a fingertip as an intuitive input device, is disclosed.

In the below cited reference No. 2, a drawing, writing, or pointing device for use with data presentation, computer-supported work, or other interactive use of a computer is disclosed.

In the below cited references No. 3 and 4, a technique of background subtraction is adopted for extracting foreground, and a skin color detector is used for removing a non-hand object such as a collar, etc., in a foreground image so as to realize hand detection.

In the following cited reference No. 5, possible arm areas are obtained by carrying out skin color detection, and then detection of the real arm area is realized by supposing that the fastest moving center of mass is the arm that is currently behaving.

Furthermore, in the following cited reference No. 6, a method of detecting fingertip shape by seeking two local features is disclosed. One local feature is that the internal portion of a fingertip is usually surrounded by a circle formed by filled pixels i.e. foreground pixels. Another local feature is that the internal portion of a square, outside ball of a finger is usually surrounded by a long chain formed by non-filled pixels and a short chain formed by filled pixels.

It is apparent that real time processing is an important evaluation index of a human-computer interaction system. In order to achieve the real time processing, in many methods, a feature that may be easily detected (for example, a quadrangle-shaped panel or a marked object) is introduced, detection of skin color is adopted in a whole or partial video image, or movement information is used for accelerating the speed of hand detection. However, the introduced feature that may be easily detected is not convenient enough for applications, and the skin color and the movement information may not be obtained under some conditions of use. As a result, it is worthwhile to seek a rapid method of detecting and positioning a hand and a finger. At the same time, as for a detection problem where a finger shape feature is not obvious due to the bad viewing angle of a single-lens video camera, the above-mentioned conventional methods cannot provide an effective way to solve the detection problem.

Cited Reference No. 1: U.S. Pat. No. 6,594,616 B2

Cited Reference No. 2: US Patent Application Publication NO. 2003/0178493 A1

Cited Reference No. 3: Shahzad Malik (smalik@cs.toronto.edu), "Real-Time Hand Tracking and Finger Tracking for Interaction", CSC2503F Project Report Cited Reference No. 4: Son DoLenh, "Multi-Finger Interactions with Paper Augmented Tabletops"

Cited Reference No. 5: "A Virtual 3D Blackboard: 3D Finger Tracking Using a Single Camera", University of Central Florida Cited Reference No. 6: "Bare-Hand Human-Computer Interaction", Proceedings of the ACM Workshop on Perceptive User Interface 2001

SUMMARY OF THE INVENTION

According to one aspect of the present invention, a hand positioning method used in a human-computer interaction system is provided. The hand positioning method comprises a step of continuously capturing a current image of a monitored display area so as to obtain a sequence of video images including a foreground object; a step of extracting a foreground image from each of the captured video images, and then carrying out binary processing with regard to the extracted foreground image so as to obtain a binary foreground image; a step of obtaining a set of vertexes of a minimum convex hull of the binary foreground image, and then creating areas of concern serving as candidate hand areas by letting the respective vertexes of the minimum convex hull of the binary foreground image be the central points of the areas of concern; and a step of extracting hand imaging features from the respective created areas of concern, and then determining a hand area from the candidate hand areas by carrying out pattern recognition based on the extracted hand imaging features.

In general, in a human-computer interaction system, since external lighting conditions are relatively bad or too complicated, appearance of skin color varies dramatically and becomes indeterminate. In addition, a camera head needs to be placed far away from a display area so that it is possible to capture the whole display area image in a wide visual field. As a result, a hand area in the captured display area image is relatively small and not clear enough; in other words, it is difficult to detect a finger in the hand area. Based on the above described problem, the hand positioning method used in a human-computer interaction system is provided in an embodiment of the present invention. The hand positioning method is rapidly finding out a few candidate hand areas from an input video image based on features of the image itself, and then determining a correct (real) hand area from the candidate hand areas by employing a pattern recognition approach. The basic concept of the above adopted technical proposal is applying attributes of a convex hull of a user body to hand detection. According to actual experimental data, in a normal operation habit, probability of a hand of a user appearing at a vertex of the user body's convex hull approaches 99.6%. As a result, the hand positioning method in the embodiment of the present invention is first rapidly obtaining a set of vertexes of a convex hull of a user body, and then creating areas of concern by letting the respective vertexes be the central points of the created areas of concern. In general, the number of the created areas of concern is not greater than 20; therefore the hand positioning method in the embodiment of the present invention may realize rapid positioning by finding out a real hand area from the candidate hand areas.

Furthermore, in the hand position method, the foreground image extraction carried out with regard to each of the captured video images may extract the foreground image by subtracting a background image without a user from the current video image according to image differencing, or by carrying out movement area detection with regard to a result of subtracting an adjacent video image of the current video image from the current video image. In addition, the foreground image extraction carried out with regard to each of the captured video images may extract the foreground image based on certain depth information obtained from a depth map of the current video image.

Furthermore, in the hand positioning method, the binary processing carried out with regard to the extracted foreground image may include a step of calculating an edge image of the extracted foreground image; a step of calculating a gradient image of the extracted foreground image, and then carrying out binary processing with regard to the gradient image so as to obtain a first binary result; a step of carrying out binary processing with regard to the extracted foreground image by using a predetermined threshold value so as to obtain a second binary result; a step of combining the edge image, the first binary result, and the second binary result by using the OR logical operation so as to obtain a new binary image; and a step of filling a closed area in the obtained new binary image.

Furthermore, in the hand positioning method, each of the areas of concern may be a rectangle or a circle just covering the hand of a user. The size of each of the areas of concern is fixed during the detection processing.

Furthermore, in the hand positioning method, the pattern recognition is carried out by using a back propagation (BP) neural network approach, a support vector machine (SVM) approach, or a Boosting approach.

Furthermore, in the hand positioning method, the feature of the minimum convex hull is that lines between any two points in the binary foreground image are located on sides of a convex polygon formed of the minimum convex hull or located inside the convex polygon.

Furthermore, in the hand positioning method, the hand imaging features include area, color, and edges based on pixel information, or shape, texture, and gradient direction histograms based on global information in the areas of concern as well as characters or their combination outside the areas of concern but having one-to-one relationships with the areas of concern. They are helpful to distinguish the hand from other parts of the body of a user, for example, a shape character of length-to-width ratio (aspect ratio) of an ellipse obtained by carrying out ellipse fitting with regard to an arm area directly connected to at least one of the areas of concern.

According to another aspect of the present invention, a human-computer interaction system is provided. The human-computer interaction system comprises a unit for continuously capturing a current image of a monitored display area so as to obtain a sequence of video images including a foreground object; a unit for extracting a foreground image from each of the captured video images, and then carrying out binary processing with regard to the extracted foreground image so as to obtain a binary foreground image; a unit for obtaining a set of vertexes of a minimum convex hull of the binary foreground image, and then creating areas of concern serving as candidate hand areas by letting the respective vertexes of the minimum convex hull of the binary foreground image be the central points of the areas of concern; and a unit for extracting hand imaging features from the respective created areas of concern, and then determining a hand area from the candidate hand areas by carrying out pattern recognition based on the extracted hand imaging features.

According to still another aspect of the present invention, a non-transitory computer-readable medium is provided. The non-transitory computer-readable medium has machine-executable instructions for execution by a processing system. The machine-executable instructions are used for carrying out a hand positioning method used in a human-computer interaction system, and the machine-executable instructions, when executed, cause the processing system to carry out a step of continuously capturing a current image of a monitored display area so as to obtain a sequence of video images including a foreground object; a step of extracting a foreground image from each of the captured video images, and then carrying out binary processing with regard to the extracted foreground image so as to obtain a binary foreground image; a step of obtaining a set of vertexes of a minimum convex hull of the binary foreground image, and then creating areas of concern serving as candidate hand areas by letting the respective vertexes of the minimum convex hull of the binary foreground image be the central points of the areas of concern; and a step of extracting hand imaging features from the respective created areas of concern, and then determining a hand area from the candidate hand areas by carrying out a pattern recognition approach based on the extracted hand imaging features.

BRIEF DESCRIPTION OF THE DRAWINGS

FIG. 11 illustrates an example of positioning an indicating point within a hand area shown in FIG. 8.

FIG. 12 illustrates an approach of recognizing a hand gesture in a video image, according to an embodiment of the present invention.

FIG. 14 is a block diagram of a system according to an embodiment of the present invention.

DETAILED DESCRIPTION OF THE PREFERRED EMBODIMENTS

Hereinafter, various embodiments of the present invention will be concretely described with reference to the drawings.

Here it should be noted that the same symbols, which are in the specification and the drawings, stand for constructional elements having the same or basically-same function and structure, and repeated explanations for the constructional elements are omitted in the specification.

Figure 1:
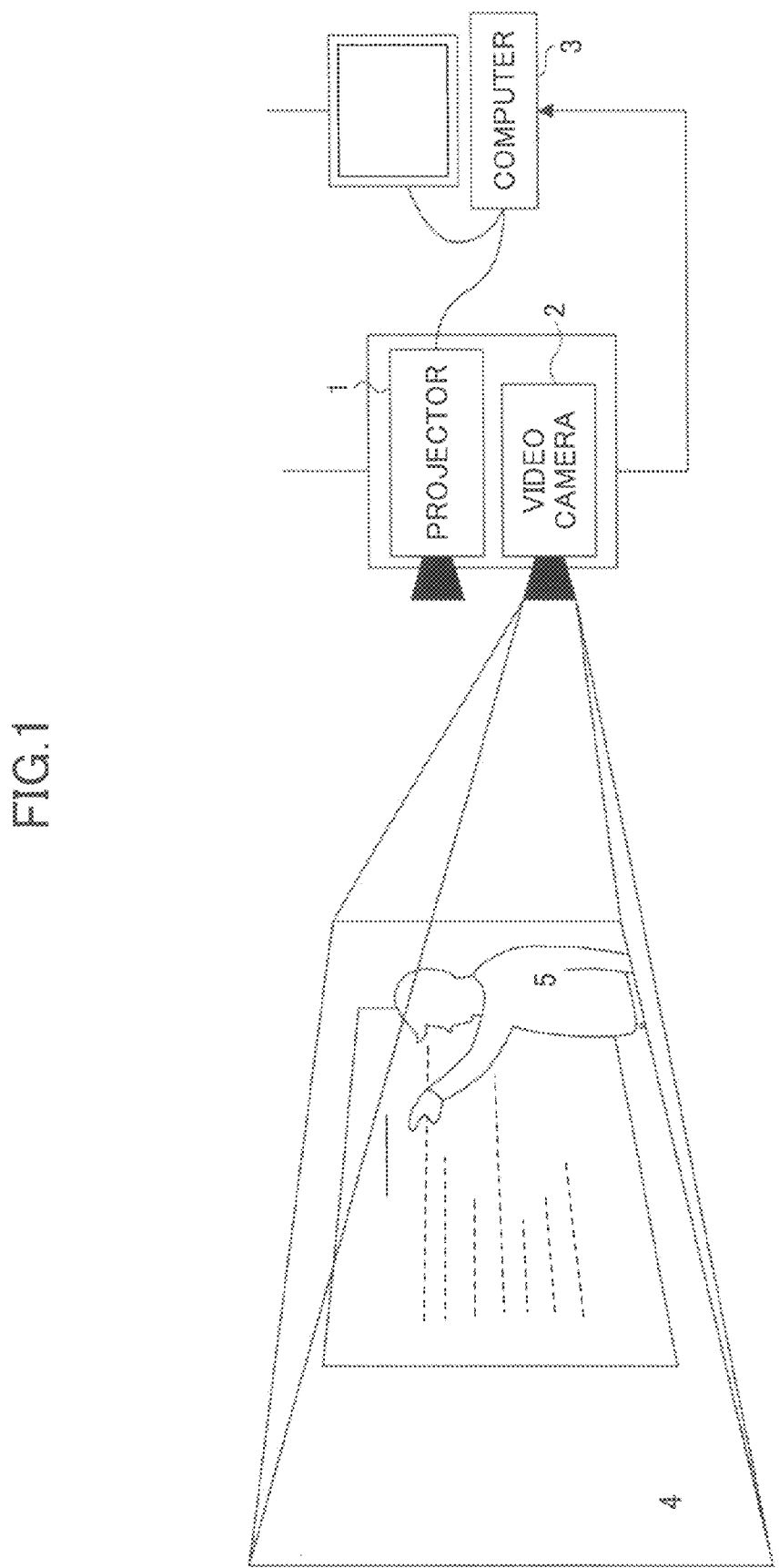
FIG. 1 illustrates a human-computer interaction system according to an embodiment of the present invention.

FIG. 1 illustrates a human-computer interaction system according to an embodiment of the present invention.

As shown in FIG. 1, a human-computer interaction system includes a projector 1, a video camera 2, a computer 3, and a projection screen (a virtual display screen) 4. A presenter 5 stands in front of the virtual display screen (a projection area) to directly carry out interactive operations with a virtual display device. The video camera 2 captures at least one video image and outputs it to the computer 3; the computer 3 analyzes the video image data so as to carry out hand and indicating point position detection and hand gesture recognition. Then, according to a predefined motion response rule, computer-based operations are simulated so that contents on the virtual display screen may be updated; the updated virtual display screen image is fed back to the virtual display device again via the projector 1 so that interactive operations between the presenter and the virtual display device may be achieved.

Figure 2:
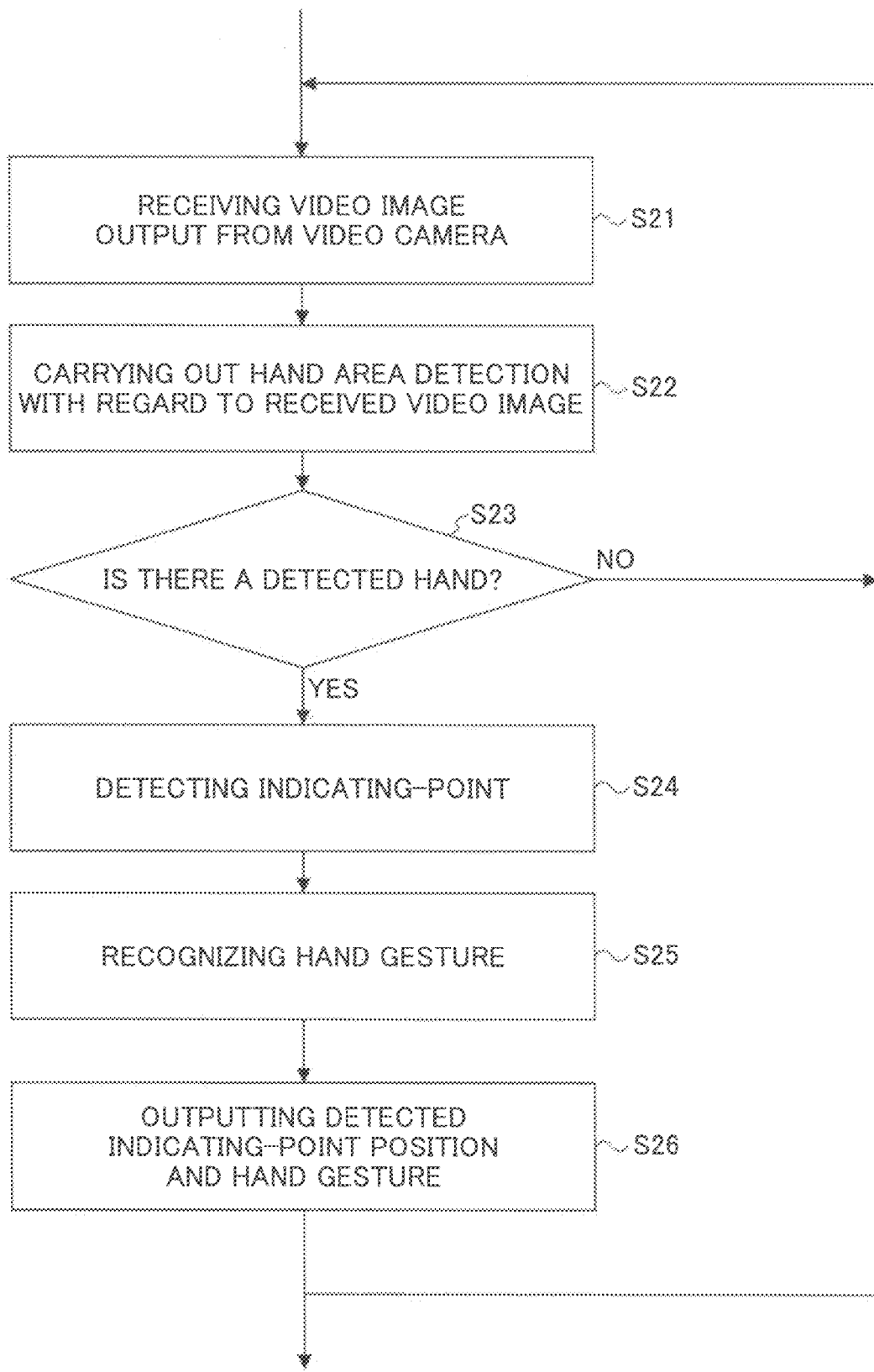
FIG. 2 is an overall flowchart of positioning a hand and an indicating point and recognizing a hand gesture in a human-computer interaction system, according to an embodiment of the present invention.

FIG. 2 is an overall flowchart of positioning a hand and an indicating point and recognizing a hand gesture in a human-computer interaction system, according to an embodiment of the present invention.

As shown in FIG. 2, in STEP S21, after the video camera 2 captures a video image of a projection area, the computer 3 receives the video image output from the video camera 2. In STEP S22, the computer 3 carries out hand area detection with regard to the received video images. In STEP S23, the computer 3 determines whether a hand is detected. If the computer 3 determines that there is a hand in the video image, then the processing shown in FIG. 2 goes to STEP S24; otherwise the processing goes back to STEP S21 to repeatedly carry out STEPS S21 and S22 with regard to a next video image received from the video camera 2. In STEP S24, detection of an indicating point in the hand area, i.e., detection of an outstretched fingertip of the hand (or a tip of a pointer like a rod in the hand) is performed. Then the processing goes to STEP S25 to perform recognition of an open-hand gesture or a close-hand gesture. Next, in STEP S26, a mouse or key operation of the computer 3 is simulated based on an object (for example, a page-tuning button) corresponding to the position of the detected indicating point so that display contents may be updated.

Figure 3:
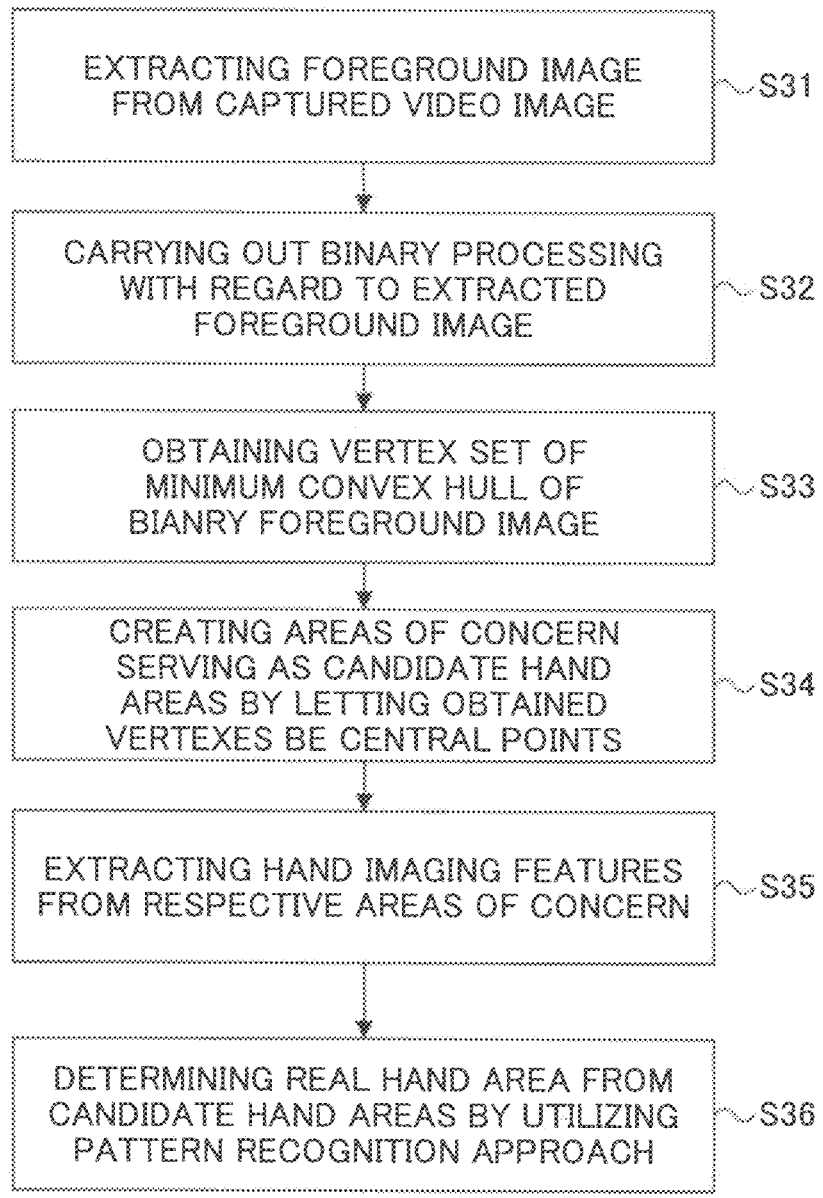
FIG. 3 is a flowchart of positioning a hand in a human-computer interaction system, according to an embodiment of the present invention.

FIG. 3 is a flowchart of positioning a hand in a human-computer interaction system, according to an embodiment of the present invention.

As shown in FIG. 3, in STEP S31, a foreground image is extracted from a captured video image. One concrete approach of extracting the foreground image is image differencing, i.e., obtaining the foreground image by subtracting a background image without a presenter from a current video image, or by carrying out movement area detection with regard to the result of subtracting an adjacent video image of a current video image from the current video image. Another concrete approach of extracting the foreground image is obtaining the foreground image by extracting certain depth information from a depth map of a current video image captured by a video capture device that may capture a video image including depth information.

Figure 4:
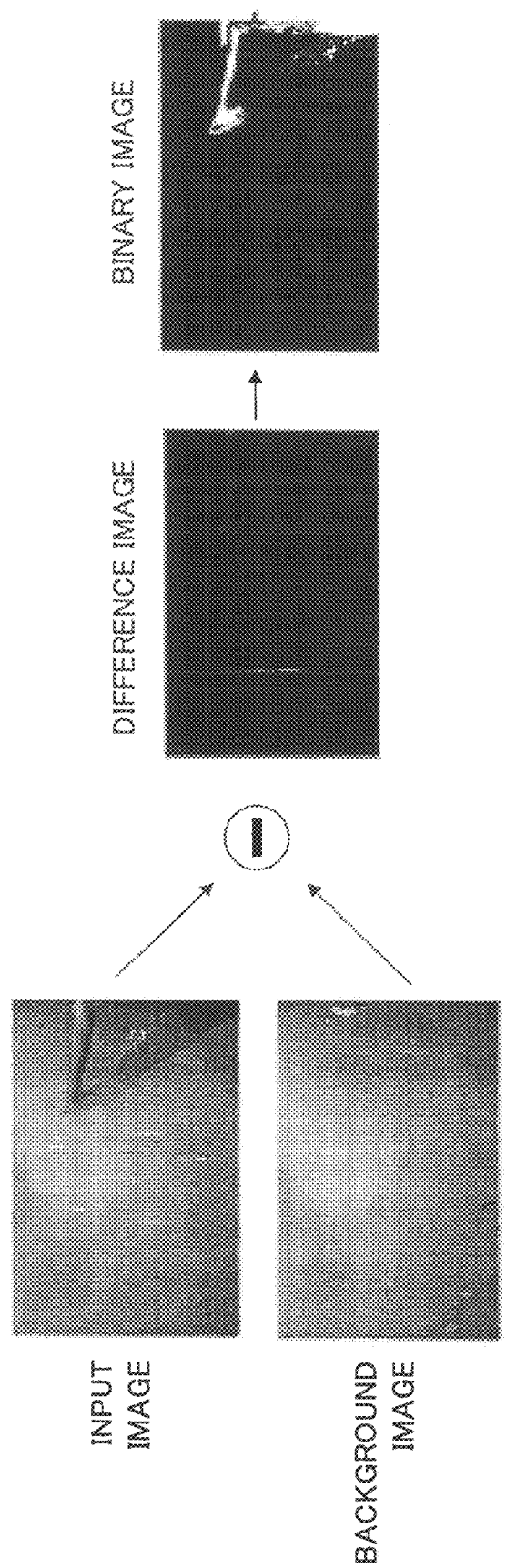
FIG. 4 illustrates an example of obtaining a foreground image as described in FIG. 3.

FIG. 4 illustrates an example of obtaining a foreground image as described in FIG. 3.

According to a concrete approach, for example, the image differencing, first a background image (that does not include any moving objects, i.e., only includes background information) is created, and then the background image is subtracted from an input video image so that a difference image (i.e. a foreground image) is obtained. Here it should be noted that after binary processing is applied to the difference image, influence caused by background or environmental light may be removed from the difference image, and the foreground image (for example, a presenter) may be enhanced naturally.

Aside from the image differencing, an approach based on moving object detection may also extract a foreground image. In addition, another preferable approach is adopting a camera head having an infrared-transmitting filter that may remove interference caused by visible light; in this way, it is possible to obtain a stable and clear foreground image.

Next, in STEP S32 of FIG. 3, binary processing is applied to the extracted foreground image. The binary processing carried out with regard to the foreground image may be realized by using an approach of seeking a foreground edge, and then filling the portion surrounded by the foreground edge.

Figure 5:
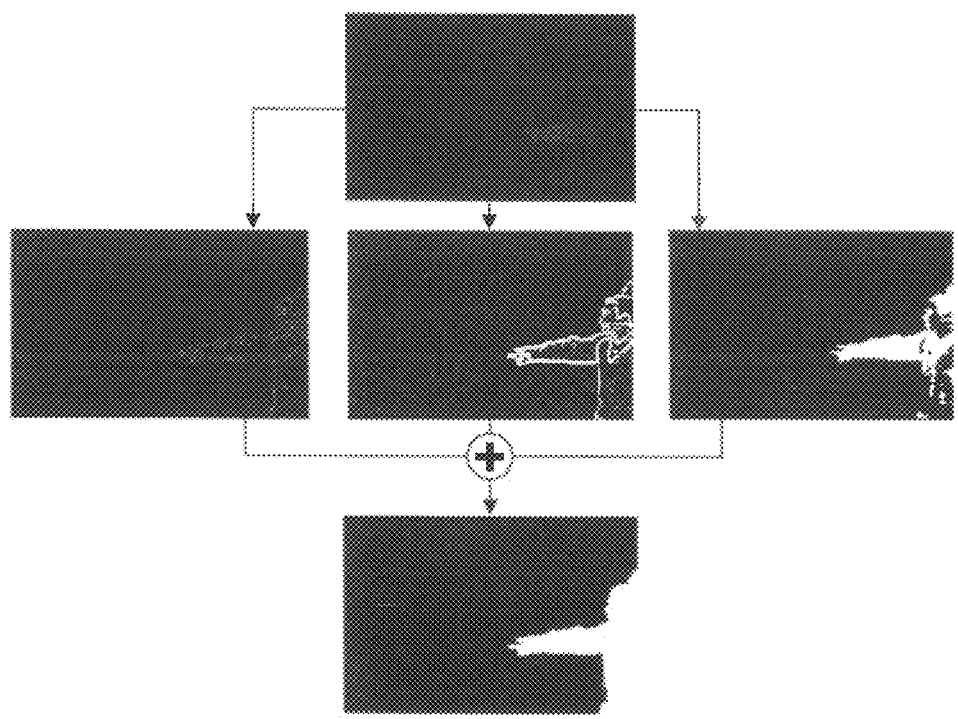
FIG. 5 illustrates an example of carrying out binary processing with regard to an extracted foreground image as described in FIG. 3.

FIG. 5 illustrates an example of carrying out binary processing with regard to an obtained foreground image as described in FIG. 3.

As shown in FIG. 5, first, as for an input difference image, its corresponding CANNY edge image, gradient image, and relatively conservative binary image obtained under a big threshold value condition are calculated, respectively. Then these three images are combined by using the OR logical operation, and the portion surrounded by a closed edge is filled. In this way, the finally obtained image becomes the result of the binary processing applied to the foreground image; that is, a binary foreground image is obtained. The reason that this approach is utilized is that the obtained result is relatively stable. In addition, this approach is effective for a case where contrast is relatively low. Of course, the present invention is not limited to this approach; that is, it is apparent for those skilled in the art that any other proper known approach, for example, Otsu's approach, may be employed in the embodiments of the present invention.

Next, in STEP S33 of FIG. 3, a set of vertexes of a minimum convex hull of the binary foreground image is obtained.

Figure 6A:
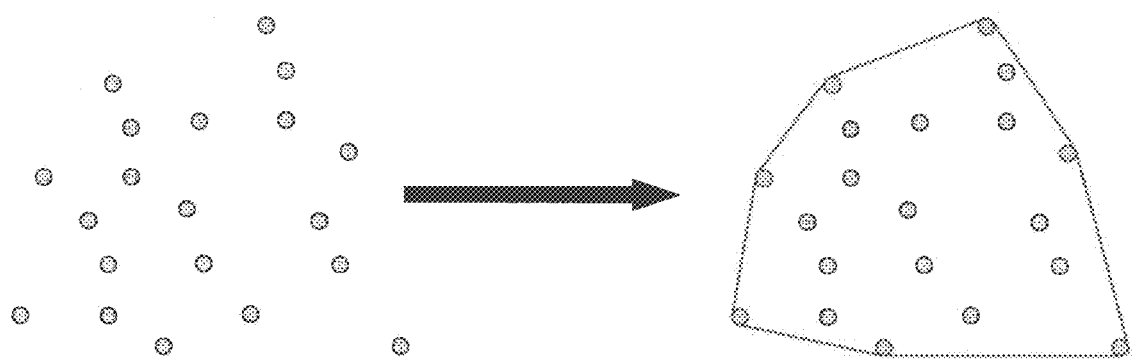
FIG. 6A illustrates a concept of a convex hull.

FIG. 6A illustrates a concept of a convex hull.

As shown in FIG. 6A, a convex hull of a point set Q refers to a minimum convex polygon P; that is, as for any points or any lines between any two points in the point set Q, they are located at sides or inside of the convex polygon P. According to experimental data, in a normal operation habit, probability of a hand of a user appearing at a vertex of the user body's convex hull approaches 99.6%. As a result, it is possible to achieve rapid hand detection by detecting a hand area based on the user body's convex hull.

Figure 6B:
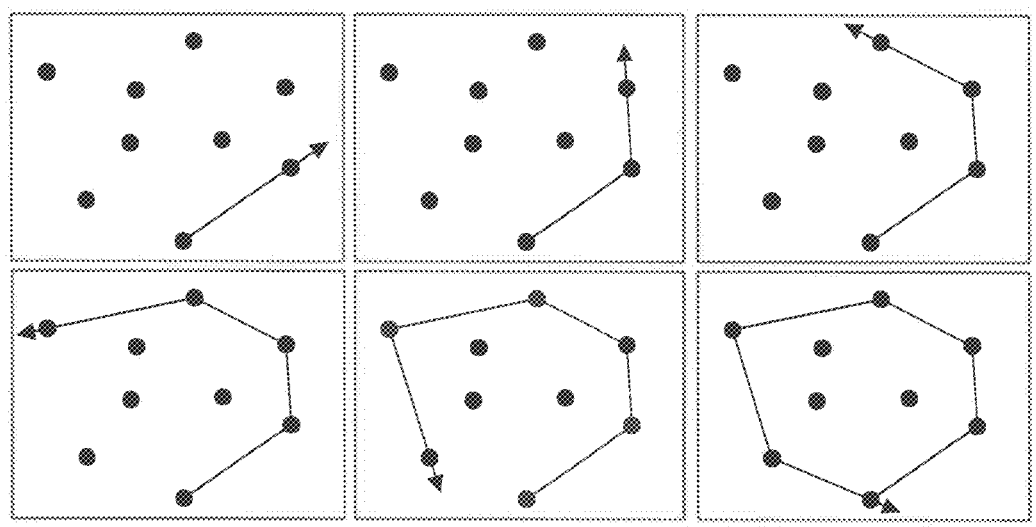
FIG. 6B illustrates an example of calculating a minimum convex hull used in calculation of a convex polygon as described in FIG. 3.

FIG. 6B illustrates an example of calculating a minimum convex hull used in calculation of a convex polygon as described in FIG. 3.

As shown in FIG. 6B, as for a given point set including n elements (points), first a point $P_0$ whose y-coordinate is minimum is found, and then a point $P_1$ is found from all of the points by letting the points except $P_0$ and $P_1$ be located on the left side of a line $P_0P_1$. Next a point $P_2$ is found from all the points by letting the points except $P_1$ and $P_2$ on the left side of a line $P_1P_2$. This kind of processing is repeatedly carried out until a point $P_k$ that is equal to $P_0$ is found. In this way, a minimum convex hull may be obtained as shown in FIG. 6B.

Figure 7:
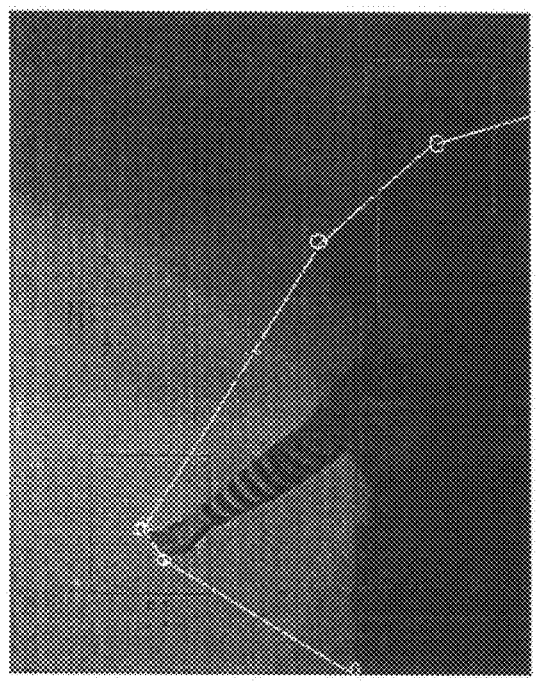
FIG. 7 illustrates an example of applying the concept shown in FIG. 6A and the calculation shown in FIG. 6B to a binary foreground image.

FIG. 7 illustrates an example of applying the concept shown in FIG. 6A and the calculation shown in FIG. 6B to a binary foreground image.

In FIG. 7, a result of calculating a convex polygon in a video image is illustrated. In particular, outline points of a binary foreground image are used to calculate the convex polygon. In this figure, small circles refer to vertexes of a minimum convex hull, and lines between two adjacent vertexes make up the convex polygon.

Next, in STEP S34 of FIG. 3, areas of concern are created by letting the respective vertexes of the minimum convex hull be the central points of the areas of concern; the areas of concern serve as candidate hand areas. In FIG. 7, all of the areas of concern created based on a set of the vertexes of the minimum convex hull are illustrated too. Each of the areas of concern is a rectangle (or a circle) obtained by letting the corresponding element (point) of the set of the vertexes of the minimum convex hull be the central point of the rectangle (or the circle); the size of the rectangle (or the circle) is fixed and may cover a normal hand. If two adjacent vertexes of the minimum convex hull are very close (for example, the two vertexes of the minimum convex hull near the hand as shown in FIG. 7), then their corresponding areas of concern may be combined as one; as for the combined area of concern, its central point is the midpoint of a line between the two adjacent vertexes of the minimum convex hull.

After the candidate hand areas are acquired, in order to determine a real hand area (i.e., an area including a hand) from the candidate hand areas, it is necessary to adopt a pattern recognition approach. This kind of pattern recognition approach may include, for example, a machine learning approach or a decision-based approach. The machine learning approach typically includes, for example, a back propagation (BP) neural network approach, a support vector machine (SVM) approach, or a Boosting approach. The decision-based approach includes, for example, a decision tree approach. No matter what approach is employed, it is necessary to first carry out feature extraction with regard to an object waiting for recognition. As a result, in STEP S35 of FIG. 3, imaging features of the hand are extracted from the respective created areas of concern.

In the embodiments of the present invention, any measurable things or their combination, by which a hand is able to be distinguished from other parts of a user body, may be used to serve as features for recognizing the hand. For example, in areas of concern, the features may include areas, color, and edges based on pixel information, or others based on global information, such as shape, texture, and gradient direction histograms. In the meantime, the features may also include some characters or their combination outside the areas of concern, related to the areas of concern (one-to-one relationships), and helpful to distinguish the hand from the other parts of the user body; for example, a shape character of length-to-width ratio of an ellipse obtained by carrying out ellipse fitting with regard to an arm area directly connected to the areas of concern.

In what follows, a concrete example of describing a hand area is illustrated. Three non-directional related features for describing the hand area are defined as follows.

(1) A feature A=AW/AB. Here AW refers to a total number of foreground pixels in an area of concern of a binary foreground image (i.e. a mask image); AB refers to the area value of the area of concern. This feature stands for an area ratio of the hand area to the area of concern.

(2) A feature B=SD/AW. Here SD refers to a total sum of grayscale values of the foreground pixels in the area of concern of the binary foreground image. This feature stands for an average grayscale of the hand area.

(3) A feature C=SC/AW. Here SC refers to the total number of CANNY edge points in the area of concern of the binary foreground image. This feature stands for edge texture complexity of the hand area.

Next, in STEP S36 of FIG. 3, an area of concern including the hand (i.e. a hand area) is determined from the candidate hand areas by using a pattern recognition approach. Here the above described concrete example is still taken as an example. As for each of the candidate hand areas, its features A, B, and C are calculated, and then its probability values P(A), P(B), and P(C) are obtained based on probability distribution of the respective features according to a probability distribution histogram of the corresponding features in a hand area imaging sample obtained in the human-computer interaction system in advance. As a simple example of recognizing the hand area from the candidate hand areas, the probabilities of the respective features in each of the areas of concern are totaled, i.e., P=P(A)+P(B)+P(C), and then a maximum P is selected from the results; if this maximum P is greater than or equal to a predetermined probability threshold value, then the area of concern corresponding to this maximum P is recognized as the hand area (i.e. the hand is detected). If each P of the totaled probabilities corresponding to all of the areas of concern is less than the predetermined probability threshold value, then it is determined that the hand area does not exist in the current video image.

In the above described concrete example of recognizing the hand area, an improved approach may be used too. The improved approach is first seeking at most n (for example, 3) areas of concern having the maximum P from all of the candidate hand areas, then obtaining candidate arm areas corresponding to these n areas of concern so as to carry out ellipse fitting with regard to the candidate arm areas, respectively (a concrete approach is, for example, finding a maximum connecting area in a circle whose center and radius are the center of an area of concern and length of an arm, respectively, and then letting the maximum connecting area be a candidate arm area), finally letting an area of concern corresponding to an ellipse obtained by carrying out the ellipse fitting, having a maximum length-to-width ratio be the hand area.

By the way, in a case where the SVM approach or the decision-based approach that is more complicated than the pattern recognition approach is adopted, the effect of recognizing the hand area is much better. However, since the SVM approach and the decision-based approach are conventional techniques, those skilled in the art may understand that it is possible to adopt the SVM approach or the decision-based approach to extract the corresponding features so as to realize the recognition based on the above described technical proposal. As a result, concrete applications of these two approaches are omitted here.

In order to cause a user to carry out human-computer interaction easily and directly, i.e., in order to let a user be able to employ an indicating point like his outstretched fingertip or an object in his hand to carry out human-computer interaction, it is necessary to more accurately obtain a position of the indicating point after positioning the hand in a video image.

As a result, in the embodiments of the present invention, it is also possible to determine an indicating point in a hand area in the human-computer interaction system based on positioning of the hand.

Figure 8:
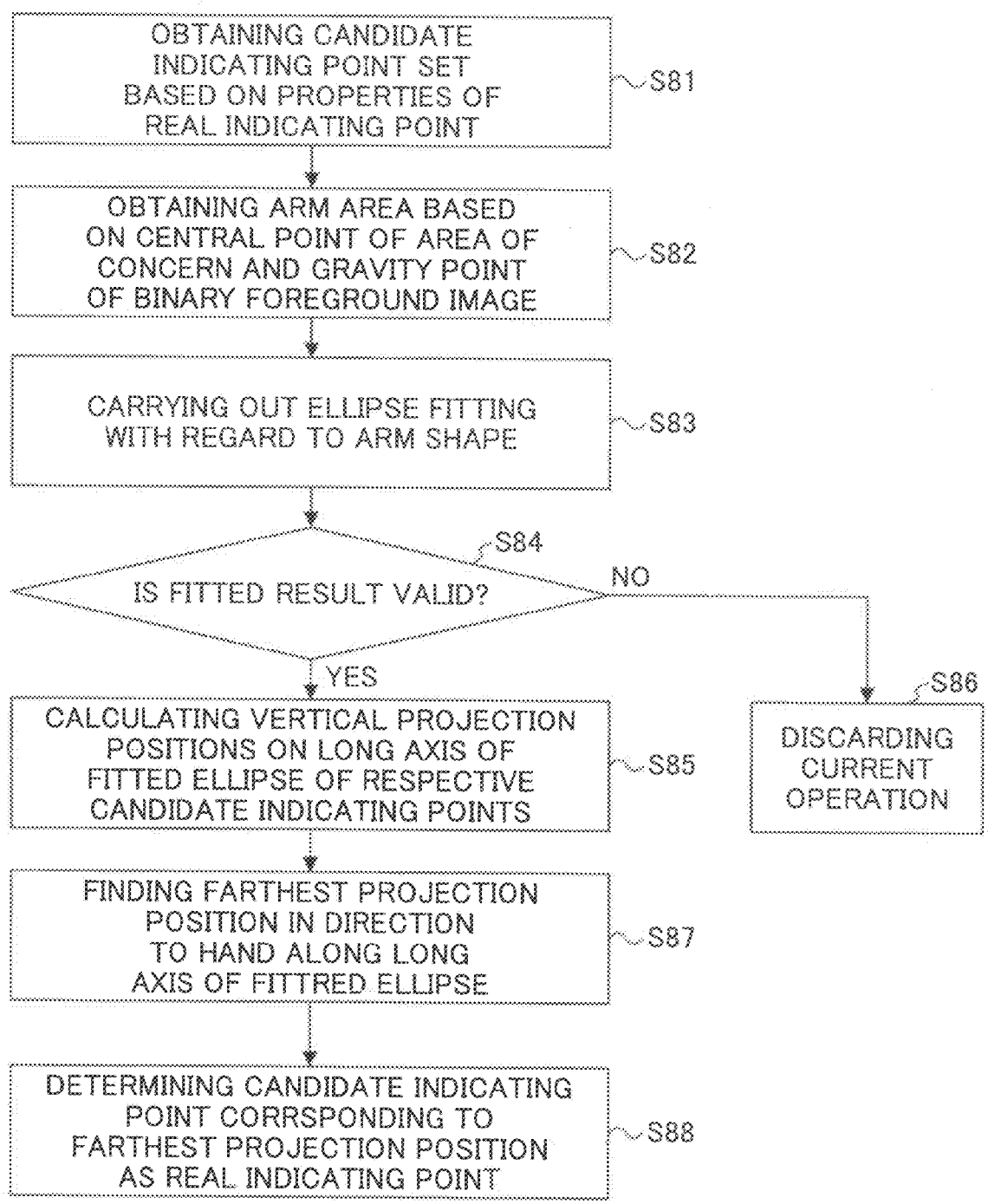
FIG. 8 is a flowchart of positioning an indicating point within a hand area in a human-computer interaction system, according to an embodiment of the present invention.

FIG. 8 is a flowchart of positioning an indicating point within a hand area in a human-computer interaction system, according to an embodiment of the present invention.

Here it should be noted that what the flowchart of FIG. 8 performs is the processing of realizing the indicating point recognition in STEP S24 of FIG. 2.

As shown in FIG. 8, after a hand area is determined, in STEP S81, a candidate indicating point set of the indicating point in the hand area is obtained based on properties of the indicating point in the hand area.

The candidate indicating point set of the indicating point in the hand area includes vertexes of a convex hull of the hand area, high curvature points on the outline of the hand, Harris corner points, points detected by a shape detection operator as described in the cited reference No. 6, etc. These candidate indicating points (for example, pixel points) reflect local properties of the indicating point like a finger tip. Since a calculation method of the candidate indicating point set is a conventional technique, and its corresponding codes are provided in an open-source project named "OpenCV", the concrete description of the calculation method is omitted here. In addition, it should be noted that the indicating point may be a position of a forefinger tip or a tip of an object in a hand.

Next, in STEP S82 of FIG. 8, an arm area is obtained based on the central point of an area of concern including the hand and the geometric center of a binary foreground image. Since the cognitive habit of human beings is from global to local in general, the position of a fingertip is finally selected from a set of candidate indicating points based on the arm and its direction information in the embodiment of the present invention. As a result, first it is necessary to obtain the position of the arm.

Figure 9:
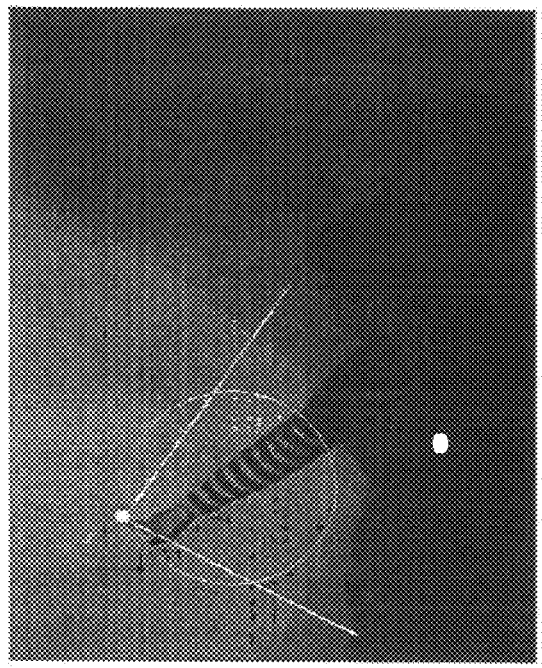
FIG. 9 illustrates an example of detecting an arm area in FIG. 8.

FIG. 9 illustrates an example of detecting an arm area in FIG. 8. Here it should be noted that FIG. 9 illustrates how to find an arm area corresponding to a designated hand from an input binary foreground image.

As shown in FIG. 9, a base point is taken from a line between the geometric center of the binary foreground image and the central point of the area of concern including the hand so that the distance from the base point to the central point of the area of concern including the hand is equal to a half of the length of a normal human arm, i.e., R. Then a circle is obtained by letting the base point taken from the line be the center of the circle and R (i.e., the half of the length of a normal human arm) be the radius of the circle, and the internal portion of the obtained circle is considered the arm area.

Next, in STEP S83 of FIG. 8, ellipse fitting is carried out for obtaining the shape of the arm based on points on the outline of the arm area or binary image data of the arm area.

Figure 10:
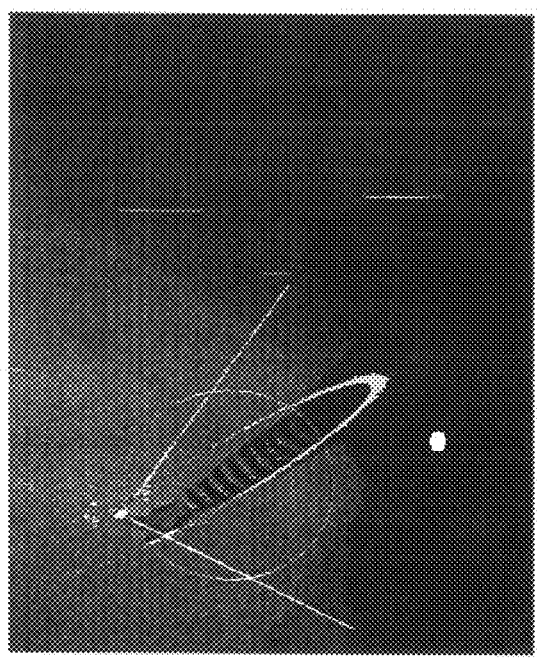
FIG. 10 illustrates an example of carrying out ellipse fitting with regard to an arm area shown in FIG. 8.

FIG. 10 illustrates an example of carrying out ellipse fitting with regard to the arm area obtained in FIG. 9.

As shown in FIG. 10, in order to obtain the regular geometric shape of the arm, a corresponding ellipse fitting function in the existing "OpenCV" is adopted to carrying out the ellipse fitting with regard to data of the arm area. Points used for carrying out the ellipse fitting may be foreground points on the binary foreground image or those on the outline of the arm area.

Sometimes there is a case where the result obtained by carrying out the ellipse fitting does not coincide with the regular outline of the arm; this kind of result is invalid. In order to solve this problem, it is necessary in STEP S84 of FIG. 8 to carry out validity determination with regard to the result of the ellipse fitting so as to throw away the invalid result at once; in this way, the next image may be processed immediately. In order to determine the validity of the result of the ellipse fitting, it is possible to carry out processing as follows. As for the fitted ellipse, a ratio of its long axis to its short axis is calculated, and an angle between the long axis and a line passing through the central point of the area of concern including the hand and the geometric center of the foreground image is calculated too. If the calculated ratio is greater than a predetermined ratio threshold value and the calculated angle is less than a predetermined angle threshold value, then it is determined that the fitted ellipse is valid. If one of the two conditions is not satisfied, then it is determined that the fitted ellipse is invalid. In general, the predetermined ratio threshold value is greater than or equal to 1.5, for example, 1.5, 1.8, 2.0, or 2.8; the predetermined angle threshold value is less than 30 degrees, for example, 25 degrees, 20 degrees, or 18 degrees. If the determined result is that the fitted ellipse is valid, then in STEP S85 of FIG. 8, the below described operation of positioning a fingertip is carried out; otherwise, in STEP S86 of FIG. 8, the current operation is discarded.

In STEP S85 of FIG. 8, vertical projection positions, on the long axis of the fitted ellipse, of the respective candidate indicating points are calculated.

FIG. 11 illustrates an example of positioning an indicating point within a hand area in FIG. 8.

As shown in FIG. 11, there are 4 candidate indicating points labeled as "A", "B", "C", and "D" (i.e. four vertexes of the convex hull of the hand). Here it should be noted that the number of the candidate indicating points is not limited to 4; for example, 3, 5, or 6 is okay too. First, the vertically projected points on the long axis of the fitted ellipse, of the respective candidate indicating points are calculated; that is, as shown in FIG. 11, the vertically projected points on the long axis are "a", "b", "c" and "d".

Next, in STEP S87 of FIG. 8, a farthest projection point is found in a direction toward the hand along the long axis of the fitted ellipse. As shown in FIG. 11, the farthest projection point in the direction toward the hand along the long axis of the fitted ellipse is "a". Another method of obtaining the farthest projection point is first selecting a point on a portion of the long axis of the fitted ellipse from the central point of the fitted ellipse toward the arm, then calculating distances between the selected point and the respective candidate indicating points, and then letting a projection point corresponding to a maximum calculated distance be the farthest projection point.

Finally, in STEP S88 of FIG. 8, a candidate indicating point corresponding to the farthest projection point is determined as the real indicating point within the hand area. Actually, as shown in FIG. 11, the candidate indicating point "A" corresponding to the farthest projection point "a" is just the position of the fingertip (i.e. the indicating point) obtained according to the from-global-to-local cognitive habit of human beings.

Furthermore, on the basis of the above described rapid indicating-point positioning method, a method of carrying out effective and stable recognition with regard to a hand gesture, for example, an open-hand gesture or a close-hand gesture, is provided in an embodiment of the present invention. Here it should be noted that the open-hand gesture refers to a state where the thumb and the forefinger are outstretched at the same time, and the close-hand gesture refers to a state where only the forefinger is outstretched. In addition, regardless of the open-hand gesture or the close-hand gesture, the forefinger is always outstretched, and its tip serves an indicating function such as what a mouse pointer does.

FIG. 12 illustrates a method of recognizing a hand gesture in a video image according to an embodiment of the present invention.

First the position of a forefinger tip in an input video image is obtained based on the method of positioning the fingertip described in the above embodiment of the present invention. Then a rectangle or a circle covering the whole hand (here it should be noted that the side length of the rectangle or the radius of the circle may be determined in advance) is created by letting the position of the forefinger tip be the central point; the rectangle or the circle serves as a research area (i.e. an area of concern) for recognizing the above described two kinds of hand gestures. Then, in this area of concern, at least one candidate point of the outstretched fingertip is calculated based on the finger shape and appearance features; the calculation method may be first finding vertexes of the convex hull of the hand in this area of concern, and then determining whether the vertexes of the convex hull are fingertips. The reason is that in general, as for a hand, the position of an outstretched fingertip should be located at a vertex of the convex hull of the hand. As shown in FIG. 12 (a), the convex hull of a hand in the figure has 3 vertexes, and two of them are fingertip positions.

Next a vertex that does not coincide with a finger feature (i.e. a non-fingertip point) is removed from the vertex set of the convex hull of the hand so as to find the positions of the outstretched fingertips. In general, as for an outstretched fingertip, its position should be a high curvature point; as a result, an example of removing the non-fingertip point is first calculating the outline curvatures of the vertexes of the convex hull of the hand, and then determining whether the curvatures are greater than a predetermined value and whether the curvature directions are positive (inward).

Calculation of the curvature of an outline point in an image may be carried out by letting the outline point be a base point; that is, first two outline points on two sides of the outline point (i.e. the base point) are taken for creating two vectors together with the outline point, and then carrying out the cross product of the two vectors to obtain the size and direction of the curvature. Here it should be noted that since curvature calculation is a well-known technique for those skilled in the art, its concrete description is omitted. In addition, it is possible to adopt a method based on shape detection as described in the cited reference No. 6 to find the positions of the fingertips from the vertex set of the convex hull of the hand. FIG. 12 (B) illustrates a result of fingertip detection.

If the detection of the fingertip position has very high correctness, then it is possible to carry out simple recognition with regard to the hand gesture based on the number of the fingertips. However, since the detected result usually includes noise, an approach of improving the recognition correctness by taking into account a certain geometric relationship is provided as follows.

First, as shown in FIG. 12 (C), by letting the forefinger tip (i.e. a point for positioning) of a hand serve as a start point $F_0$, next fingertips may be found along the outline of the hand (i.e. the edge of the binary image of the hand) toward two side directions, respectively. Here it should be noted that in order to avoid obtaining overlap results, the finding operations are only carried out with regard to respective halves of the outline. If it is supposed that the found fingertip is $F_1$, then the found result may be expressed as a data record $\{F_0, F_1, F_0F_1\}$; here $F_0F_1$ refers to the portion of the outline of the hand between $F_0$ and $F_1$ as shown in FIG. 12 (D). As for each fingertip found along the outline, the corresponding found result is recorded in the same manner.

As for the data record of each fingertip, for example, $\{F_0, F_1, F_0F_1\}$, a turning point located at the portion of the outline between $F_0$ and $F_1$ is calculated. The turning point may be considered the joint position of the thumb and the forefinger of the hand, and the feature of the turning point is that the curvature of the outline of the hand at the turning point is greater than a predetermined value and the curvature direction is negative (outward). If there is not a turning point, then this data record is discarded. After carrying out the turning point calculation with regard to each of the data records, if no data record exists, then it is determined that the hand gesture is a close-hand gesture; then the processing ends. FIG. 12 (E) illustrates the calculation result of a turning point in a case where the turning point exists.

On the other hand, if some data records exist after carrying out the turning point calculation, then for each of the data records, geometric relationships within a triangle formed of the two fingertips (for example, A and B) and the turning point (for example, O) are calculated, and whether the hand gesture corresponding to this data record is the open-hand gesture is determined based on the geometric relationships. In particular, if the angle between two line segments AO and OB ranges between, for example, 30-150 degrees, and the length of each of the three sides of the triangle is greater than or equal to a predetermined length value, then the hand gesture is determined as the open-hand gesture. In addition, a condition where the length between the turning point and the forefinger tip is greater than or equal to the length between the turning point and the thumb tip may be used to determine the hand gesture too. FIG. 12 (F) illustrates the reasonable geometric relationships within a triangle representing an open-hand gesture.

Figure 13:
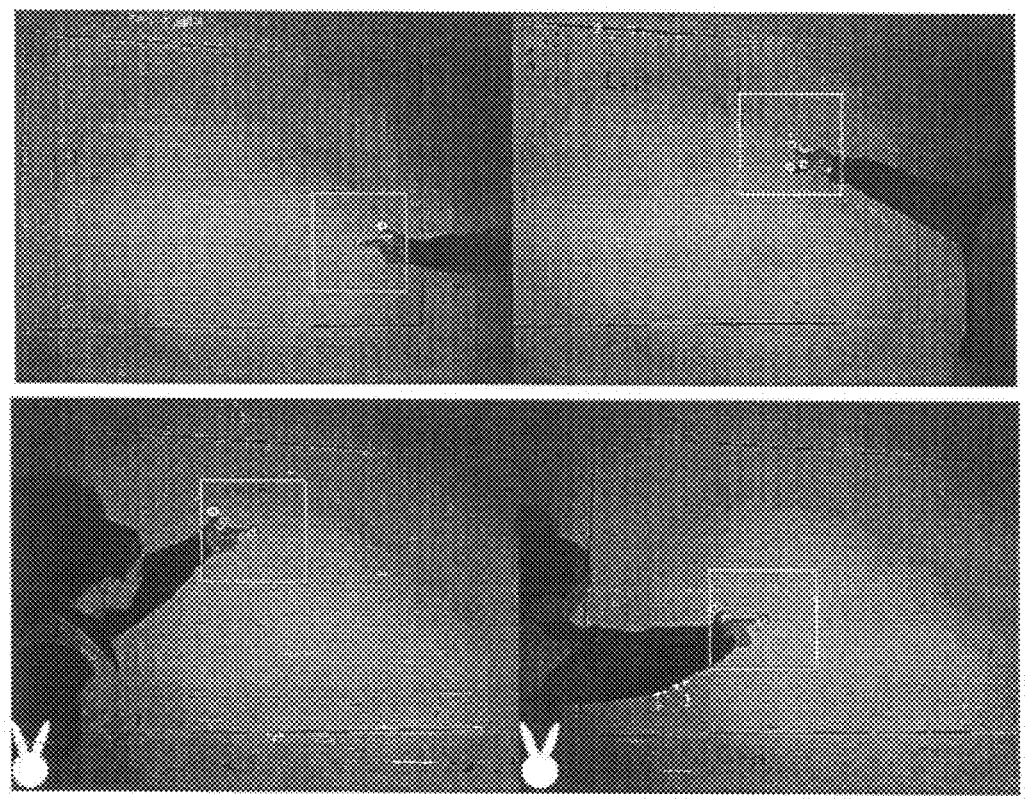
FIG. 13 illustrates an example of recognizing a hand gesture in an image.

FIG. 13 illustrates an example of recognizing a hand gesture in an image.

When adopting the hand gesture detection method described in the embodiment of the present invention to carry out hand gesture detection in an original image whose size is 720×480 as shown in FIG. 13, the detection speed is 58 ms/frame. This detection speed value is obtained in a circumstance without any optimization. As a result, the detection and recognition speed according to the embodiment of the present invent may entirely satisfy the needs of real time processing.

FIG. 14 is a block diagram of a system according to an embodiment of the present invention.

As shown in FIG. 14, the system is mainly divided into four parts as follows: a hand detection part 141, an indicating-point positioning part 142, a hand gesture recognition part 143, and an instruction-and-operation interaction unit 144. The hand detection part 141 comprises a video image capture unit 1411 used to continuously capture the current image of a monitored area so as to obtain a sequence of video images including a foreground object; a foreground image extraction unit 1412 used to extract a foreground image from each of the captured video images and carry out binary processing with regard to the extracted foreground image so as to obtain a binary foreground image; an area-of-concern creation unit 1413 used to obtain a set of vertexes of the minimum convex hull of the binary foreground image and create areas of concern by letting the respective vertexes of the minimum convex hull be central points to serve as candidate hand areas; a hand area recognition unit 1414 used to extract hand imaging features from the respective created areas of concern and adopt a pattern recognition approach to determine a real hand area from the candidate hand areas; and a hand area output unit 1415 used to output the hand area. The indicating-point positioning part 142 comprises a hand area input unit 1421 used to detect a hand area from a captured video image (or receive the hand area output from the output unit 1415); an arm area ellipse-fitting unit 1422 used to obtain an arm area connected with the detected hand area and carry out ellipse fitting with regard to the arm shape so as to obtain an ellipse-fitting result; an ellipse-fitting result determination unit 1423 used to determine the correctness of the ellipse-fitting result; a candidate indicating-point position obtaining unit 1424 used to obtain a set of candidate indicating points of an indicating point in the hand area based on features of the indicating point in the hand area; an indicating-point positing unit 1425 used to determine, in a case where the ellipse-fitting result is correct, a farthest candidate indicating point of the indicating point in the hand area in the direction toward the hand along the long axis of the fitted ellipse as the indicating point of the hand area; and an indicating-point position output unit 1426 used to output the indicating point position. The hand gesture recognition part 143 comprises an indicating point position input unit 1431 used to detect a hand area from an input video image and determine the position of a fingertip in the hand area serving as an indicating point (or receive the indicating point position output from the indicating-point position output unit 1426); a next-fingertip detection unit 1432 used to detect a next fingertip along the outline of the hand toward two side directions by letting the determined position of the fingertip be a start point; a turning-point positioning unit 1433 used to obtain a portion of the outline of the hand from the determined fingertip position to the detected next fingertip position so as to obtain a turning point in the portion of the outline; a hand gesture determination unit 1434 used to determine whether a current hand gesture is an open-hand gesture or a close-hand gesture based on a geometric relationship in a triangle formed of the determined fingertip position, the detected next fingertip position, and the found turning point position; and a hand gesture output unit 1435 used to output the detected hand gesture result. Finally the instruction-and-operation interaction unit 144 converts the detected indicating point position and the detected hand gesture result into instructions for use of a computer according to a certain rule so as to achieve human-computer interaction.

A series of operations described in this specification may be executed by hardware, software, or a combination of the hardware and the software. When the operations are executed by the software, a computer program can be installed in a dedicated built-in storage device of a computer so that the computer may execute the computer program. Alternatively, the computer program may be installed in a common purpose computer by which various types of processes may be executed so that the common purpose computer may execute the computer program.

For example, the computer program may be stored in a recording medium such as a hard disk or a ROM in advance. Alternatively, the computer program may be temporarily or permanently stored (or recorded) in a movable recording medium such as a floppy disk, a CD-ROM, a MO disk, a DVD, a magic disk, or a semiconductor storage device. In addition, it is also possible to provide this kind of movable recording medium as a software package.

According to one aspect of the present invention, a method of positioning an indicating point in a hand area, used in a human-computer interaction system is provided. The method of positioning an indicating point in a hand area comprises a step of detecting the hand area in a captured video image, and then calculating a candidate indicating point set (for example, a candidate pixel point set) of the indicating point in the hand area based on properties of the indicating point in the hand area; a step of obtaining a candidate arm area closely connected to the hand area, and then carrying out ellipse fitting with regard to shape of the candidate arm area so as to obtain an ellipse-fitting result (i.e. a fitted ellipse); and a step of determining, in a case where the ellipse-fitting result is valid, a farthest candidate indicating point of the indicating point in a direction toward the hand along the long axis of the fitted ellipse as the indicating point of the hand area.

The method of positioning an indicating point (for example, a fingertip) in a hand area in an embodiment of the present invention refers to a from-global-to-local cognitive habit of human beings and obtains the position of the indicating point in a manner where ellipse fitting is carried out with regard to the arm shape, and then a farthest point is found along the long axis of the fitted ellipse. By employing the method of positioning an indicating point in a hand in the embodiment of the present invention, it is possible to overcome detection difficulty in a case where finger features in a captured image are not clear due to an unideal viewing angle of a single-lens video camera, or a captured image is vague due to fast movement. An example of the detection difficulty is that when the direction of a camera head is parallel to the body of a presenter, the shape feature of a fingertip in a final image may be weakened dramatically. By combining global information and local information, the method of positioning an indicating point in a hand in the embodiment of the present invention may give a reliable positioning result that meets the cognitive habit of human beings; in other words, insufficiency of only using local features may be avoided, and detection missing rate may be decreased. As a result, the method of positioning an indicating point in a hand in the embedment of the present invention may be more suitable for detecting and positioning a continuously moving finger in a human-computer interaction system.

Furthermore, in the method of positioning an indicating point in a hand, the indicating point may be a position of the forefinger tip of the hand or a tip of an object in the hand.

Furthermore, in the method of positioning an indicating point in a hand, the calculated candidate indicating point set of the indicating point in the hand area includes vertexes of a convex hull of the hand, high curvature points on an outline of the hand, Harris corner points, or points detected based on finger shape filtering.

Furthermore, in the method of positioning an indicating point in a hand, the candidate arm area closely connected to the hand area may be obtained by carrying out a step of taking a base point from a line between the geometric center of a foreground image and the central point of the hand area so that the distance from the base point to the central point is equal to a half of the length of a normal human arm; and a step of obtaining a circle by letting the base point taken from the line be the center of the circle and the half of the length of a normal human arm be the radius of the circle, and then letting the internal portion of the obtained circle be the arm area.

Furthermore, in the method of positioning an indicating point in a hand, after carrying out the ellipse fitting with regard to the shape of the candidate arm area and before positioning the indicating point in the hand area, a step, of comparing a ratio of the long axis of the fitted ellipse to the short axis of the fitted ellipse with a predetermined ratio threshold value, is included. If the ratio is greater than the predetermined ratio threshold value, then the fitted ellipse is valid; otherwise the fitted ellipse is invalid.

Furthermore, in the method of positioning an indicating point in a hand, after carrying out the ellipse fitting with regard to the shape of the candidate arm area and before positioning the indicating point in the hand area, a step, of calculating an angle formed by the long axis and a line passing through the central point of the hand area and the geometric center of the foreground image, is further included. If the calculated angle is less than a predetermined angle threshold value, then the fitted ellipse is valid; otherwise the fitted ellipse is invalid.

Furthermore, in the method of positioning an indicating point in a hand, the step of determining, in a case where the ellipse-fitting result is valid, a farthest candidate indicating point of the indicating point in a direction toward the hand along the long axis of the fitted ellipse as the indicating point of the hand area includes: a step of calculating vertical projection points on the long axis of the fitted ellipse, of the respective candidate indicating points, then finding a farthest projection point in a direction toward the hand along the long axis of the fitted ellipse, and then letting a candidate indicating point corresponding to the farthest projection point be the indicating point in the hand area; or a step of selecting a point on a portion of the long axis of the fitted ellipse from the central point of the fitted ellipse toward the arm, then calculating distances between the selected point and the respective candidate indicating points, and then letting a candidate indicating point corresponding to the maximum distance be the indicating point in the hand area.

According to another aspect of the present invention, a method of recognizing a hand gesture, used in a human-computer interaction system is provided. The method of recognizing a hand gesture comprises a step of detecting a hand area in an input video image, and then positioning a fingertip serving as an indicating point in the hand area; a step of detecting, by letting the positioned indicating point be a start point, a next fingertip along an outline of the hand toward two side directions; a step of determining, if the next fingertip is not detected, that the hand gesture is a close-hand gesture; a step of obtaining, if the next fingertip is detected, a portion of the outline of the hand from the positioned indicating point to the detected next fingertip position, and then finding out a turning point located on the portion of the outline of the hand; and a step of recognizing the hand gesture according to at least one geometric relationship in a triangle formed of the positioned indicating point, the detected next fingertip position, and the found turning point.

Here it should be noted that the hand gesture includes an open-hand gesture and the close-hand gesture. The open-hand gesture refers to a state where the thumb and the forefinger of a hand are outstretched at the same time, and the close-hand gesture refers to a state where only the forefinger of the hand is outstretched.

The method of recognizing a hand gesture in an embodiment of the present invention recognizes the above mentioned two kinds of hand gestures by detecting fingertip positions, and then utilizing their geometric relationships; this is an intuitive recognition method. In general, when recognizing a hand gesture, the number of outstretched fingers and the geometric relationships created by the outstretched fingers are the most important and stable features. As a result, the method of recognizing a hand gesture in the embodiment of the present invention utilizes these features and obeys the cognitive habit of human beings to realize the recognition of the hand gesture; in other words, it is possible to achieve simple and highly efficient hand gesture recognition by using the method of recognizing a hand gesture in the embodiment of the present invention. In addition, insufficiency in conventional pattern recognition where a high-dimension feature vector training classifier is used, for example, big samples, slow convergence, unstable factors in extension of a trained model, or black box effects in a recognition process may be avoided. As a result, the method of recognizing a hand gesture in the embodiment of the present invention is a self-motivated recognition method and may obtain a better recognition result.

Furthermore, in the method of recognizing a hand gesture, if the value of an angle formed by a side from the positioned indicating point to the turning point and a side from the next fingertip position to the turning point in the triangle is within a predetermined range, and the length of each side of the triangle is greater than a predetermined length threshold value, then the hand gesture is determined as an open-hand gesture; otherwise the hand gesture is determined as an close-hand gesture.

Furthermore, in the method of recognizing a hand gesture, the detected next fingertip is a position different from the indicating point in the hand area, and curvature of the outline at the position is greater than a predetermined curvature threshold value and the curvature direction is positive (inward).

Furthermore, in the method of recognizing a hand gesture, as for the step of detecting, by letting the positioned indicating point be a start point, a next fingertip along an outline of the hand toward two side directions, the detection length along the outline toward each of the two side directions is not greater than a half of the outline so as to avoid overlap of the detected results.

Furthermore, in the method of recognizing a hand gesture, the position of the turning point refers to a point on the portion of the outline of the hand; here the curvature direction of the outline at the point is negative (outward), and the absolute value of the curvature of the outline at the point is greater than another predetermined curvature threshold value.

According to still another aspect of the present invention, a human-computer interaction system is provided. The human-computer interaction comprises a unit for detecting a hand area from a captured video image, and then calculating a candidate indicating point set of an indicating point in the hand area based on properties of the indicating point in the hand area; a unit for obtaining a candidate arm area directly connected to the hand area, and then carrying out ellipse fitting with regard to the shape of the candidate arm area; and a unit for determining, in a case where the ellipse-fitting result (i.e. a fitted ellipse) is valid, a farthest candidate indicating point of the indicating point in a direction toward the hand along the long axis of the fitted ellipse as the indicating point of the hand area.

According to still another aspect of the present invention, a human-computer interaction system is provided. The human-computer interaction comprises a unit for detecting a hand area in an input video image, and then positioning a fingertip serving as an indicating point in the hand area; a unit for detecting, by letting the positioned indicating point be a start point, a next fingertip along an outline of the hand toward two side directions; a unit for determining, if the next fingertip is not detected, that the hand gesture is a close-hand gesture; a unit for obtaining, if the next fingertip is detected, a portion of the outline of the hand from the positioned indicating point to the detected next fingertip position, and then finding out a turning point located on the portion of the outline of the hand;

and a unit for recognizing the hand gesture according to at least one geometric relationship in a triangle formed by the positioned indicating point, the detected next fingertip position, and the found turning point.

Therefore it may be understood that in the above described positioning methods and the human-computer interaction systems, there are three features as follows. The first feature is that a vertex set of a convex hull is utilized to reduce the number of candidate areas of concern so that it is possible to realize rapid detection of an object. The second feature is that positioning of a fingertip is realized by taking into account a from-global-to-local cognitive habit of human beings so that it is possible to overcome detection difficulty in a case where finger features in a captured image are not clear due to a less than an ideal viewing angle of a single-lens video camera, or a captured image is blurred due to fast movement. The third feature is that finger detection and at least one geometric relationship of fingers are adopted so that it is possible to achieve recognition of an open-hand gesture or a close-hand gesture.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010279511.3 filed on Sep. 13, 2010, the entire contents of which are hereby incorporated by reference.

What is claimed is:

1. A hand-positioning method used in a human-computer interaction system comprises:
   continuously capturing a current image of a monitored display area so as to obtain a sequence of video images including a foreground object;
   extracting a foreground image from each of the obtained video images, and then carrying out binary processing with regard to the extracted foreground image so as to obtain a binary foreground image;
   obtaining a set of vertexes of a minimum convex hull of the binary foreground image, and then creating areas of concern serving as candidate hand areas by letting the respective vertexes of the minimum convex hull of the binary foreground image be central points of the areas of concern; and
   extracting hand imaging features from the respective created areas of concern, and then determining a hand area from the candidate hand areas by carrying out pattern recognition based on the extracted hand imaging features, wherein
   the binary processing carried out with regard to the extracted foreground image includes:
   calculating an edge image of the extracted foreground image;
   calculating a gradient image of the extracted foreground image, and then carrying out binary processing with regard to the gradient image so as to obtain a first binary result;
   carrying out binary processing with regard to the extracted foreground image by using a predetermined threshold value so as to obtain a second binary result;
   combining the edge image, the first binary result, and the second binary result by using an OR logical operation so as to obtain a new binary image; and
   filling a closed area in the obtained new binary image.

2. The hand-positioning method according to claim 1, wherein:
   each of the areas of concern is a rectangle or a circle just covering a hand of a user.

3. The hand-positioning method according to claim 1, wherein:
   the pattern recognition is carried out by using a back propagation (BP) neural network approach, a support vector machine (SVM) approach, or a Boosting approach.

4. The hand-positioning method according to claim 1, wherein:
   the hand imaging features include:
   area, color, and edges based on pixel information, or shape, texture, and gradient direction histograms based on global information in the areas of concern; and
   characters or their combination outside the areas of concern but having one-to-one relationships with the areas of concern, helpful to distinguish a hand from other parts of a body of a user.

5. A human-computer interaction system comprises:
   circuitry configured to:
   continuously capture a current image of a monitored display area so as to obtain a sequence of video images including a foreground object;
   extract a foreground image from each of the obtained video images, and then carry out binary processing with regard to the extracted foreground image so as to obtain a binary foreground image;
   obtain a set of vertexes of a minimum convex hull of the binary foreground image, and then create areas of concern serving as candidate hand areas by letting the respective vertexes of the minimum convex hull of the binary foreground image be central points of the areas of concern; and
   extract hand imaging features from the respective created areas of concern, and then determine a hand area from the candidate hand areas by carrying out pattern recognition based on the extracted hand imaging features, wherein the circuitry is configured to carry out the binary processing with regard to the extracted foreground image by:
   calculating an edge image of the extracted foreground image;
   calculating a gradient image of the extracted foreground image, and then carrying out binary processing with regard to the gradient image so as to obtain a first binary result;
   carrying out binary processing with regard to the extracted foreground image by using a predetermined threshold value so as to obtain a second binary result;
   combining the edge image, the first binary result, and the second binary result by using an OR logical operation so as to obtain a new binary image; and
   filling a closed area in the obtained new binary image.

6. The system according to claim 5, wherein:
   each of the areas of concern is a rectangle or a circle just covering a hand of a user.

7. The system according to claim 5, wherein:
   the pattern recognition is carried out by using a back propagation (BP) neural network approach, a support vector machine (SVM) approach, or a Boosting approach.

8. The system according to claim 5, wherein:
the hand imaging features include:
- area, color, and edges based on pixel information, or shape, texture, and gradient direction histograms based on global information in the areas of concern; and
- characters or their combination outside the areas of concern but having one-to-one relationships with the areas of concern, helpful to distinguish a hand from other parts of a body of a user.

9. A non-transitory computer-readable medium having machine-executable instructions for execution by a processing system, wherein, the machine-executable instructions are used for carrying out a hand-positioning method used in a human-computer interaction system, and the machine-executable instructions, when executed, cause the processing system to:
- continuously capture a current image of a monitored display area so as to obtain a sequence of video images including a foreground object;
- extract a foreground image from each of the obtained video images, and then carry out binary processing with regard to the extracted foreground image so as to obtain a binary foreground image;
- obtain a set of vertexes of a minimum convex hull of the binary foreground image, and then create areas of concern serving as candidate hand areas by letting the respective vertexes of the minimum convex hull of the binary foreground image be central points of the areas of concern; and
- extract hand imaging features from the respective created areas of concern, and then determine a hand area from the candidate hand areas by carrying out pattern recognition based on the extracted hand imaging features, wherein the binary processing carried out with regard to the extracted foreground image includes:
- calculating an edge image of the extracted foreground image;
- calculating a gradient image of the extracted foreground image, and then carrying out binary processing with regard to the gradient image so as to obtain a first binary result;
- carrying out binary processing with regard to the extracted foreground image by using a predetermined threshold value so as to obtain a second binary result;
- combining the edge image, the first binary result, and the second binary result by using an OR logical operation so as to obtain a new binary image; and
- filling a closed area in the obtained new binary image.

* * * * *